United States Patent [19]

Yoshida et al.

[11] Patent Number: 5,256,750
[45] Date of Patent: Oct. 26, 1993

[54] HYDROGENATED LIQUID PETROLEUM RESIN AND HOT MELT PRESSURE-SENSITIVE ADHESIVE COMPOSITION CONTAINING THE SAME

[75] Inventors: Hajime Yoshida; Akira Uekusa, both of Kanagawa; Takashi Satoh, Ibaraki; Ryoji Ohnishi, Kanagawa, all of Japan

[73] Assignee: Mitsubishi Oil Co., Ltd., Tokyo, Japan

[21] Appl. No.: 889,435

[22] Filed: May 28, 1992

[30] Foreign Application Priority Data

May 29, 1991 [JP] Japan .................. 3-152206

[51] Int. Cl.⁵ .......................................... C08F 10/14
[52] U.S. Cl. ........................... 526/290; 525/327.9; 525/338
[58] Field of Search ............ 525/327.9, 338; 526/290

[56] References Cited

U.S. PATENT DOCUMENTS

| | | | |
|---|---|---|---|
| 2,824,860 | 2/1958 | Aldridge et al. | 525/327.9 |
| 2,963,467 | 12/1960 | Small | 526/290 |
| 3,655,629 | 4/1972 | Takahara | 526/290 |

FOREIGN PATENT DOCUMENTS 0131460  1/1985  European Pat. Off. ............ 526/290

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

A hydrogenated liquid petroleum resin obtained by hydrogenating an aromatic liquid petroleum resin having a structure in which aromatic rings are linked by the medium of a methylene group, and a hot melt pressure-sensitive adhesive composition containing the same.

8 Claims, No Drawings

HYDROGENATED LIQUID PETROLEUM RESIN AND HOT MELT PRESSURE-SENSITIVE ADHESIVE COMPOSITION CONTAINING THE SAME

FIELD OF THE INVENTION

The present invention relates to a hydrogenated liquid petroleum resin having a novel structure and a hot melt pressure-sensitive adhesive composition containing the same.

More particularly, this invention relates to a hydrogenated liquid petroleum resin which has been obtained by hydrogenating an aromatic liquid petroleum resin having a structure in which aromatic rings are linked by the medium of a methylene group, and which has a low viscosity and is odorless and light colored or colorless, excellent in compatibility, and tackiness properties, and to a hot melt pressure-sensitive adhesive composition containing the hydrogenated liquid petroleum resin as a softener and having a low viscosity and well balanced tackiness properties.

The hydrogenated liquid petroleum resin of the present invention is expected to be used for applications in many fields, due to its low viscosity, light colored or colorless, and odorless nature. In particular, a hot melt pressure-sensitive adhesive composition containing the hydrogenated liquid petroleum resin of the present invention as a softener shows excellent workability because of its low viscosity and has a well balanced combination of three tackiness properties and, hence, various applications thereof in a wide range of industrial fields can be expected.

BACKGROUND OF THE INVENTION

Although various kinds of liquid petroleum resins have been produced hitherto, a liquid petroleum resin which is excellent in color and odor (odorless) and which, when used as a softener for pressure-sensitive adhesives, can impart excellent three tackiness properties has not been obtained. As oils used in the same applications as liquid petroleum resins, various process oils produced from mineral oils are known. However, the uses of these process oils have been limited since in general such process oils unavoidably have the petroleum odor and have been colored. Specifically, for example, in the case of using a process oil as a softener for pressure-sensitive adhesives, the resulting adhesive compositions have been defective in color and odor and, in addition, unable to show sufficient performances with respect to three tackiness properties. Further, although pressuresensitive adhesives containing a highly purified liquid petroleum resin or process oil may be satisfactory in both color and odor, none of such adhesives satisfies the requirement of three tackiness properties.

In general, a pressure-sensitive adhesive is prepared by incorporating a tackifier, softener, and other ingredients into an elastomer as the base polymer. As the softener, process oils of the paraffinic, naphthenic, or similar type produced from mineral oils are most frequently used. Such pressure-sensitive adhesives are being extensively used in the form of tape, label, sheet, or the like for such applications as packaging, sealing, labeling, masking, surface protection, corrosion prevention, electrical insulation, medical uses, and double-side bonding.

A pressure-sensitive adhesive tape, for example, is produced by the following method.

A diene-type polymer, such as natural rubber, styrene-butadiene rubber, or isoprene rubber, as an elastomer is dissolved in an organic solvent along with a tackifier and softener and with, according to need, a stabilizer, filler, and other additives thereby to prepare a solution-form mixture of these ingredients. This solution is then coated on a tape material, release paper, or other substrate and the coating is dried to evaporate and remove the solvent, to produce a pressure-sensitive adhesive tape.

However, from the standpoints of safety, environmental pollution prevention, and production efficiency, production of pressure-sensitive adhesive tapes by a hot melt technique using no organic solvent is spreading rapidly in recent years. In this hot melt production technique, a mixture of a base polymer, tackifier, softener, and other ingredients is melted by heating and the melt is applied on a tape material or the like. The adhesive mixture is therefore required to have an adequate melt viscosity so as to attain good coating properties and production efficiency.

As the base polymer for such a hot melt pressuresensitive adhesive, various polymers are employed such as block copolymers of a conjugated diene and a vinyl-containing aromatic hydrocarbon (hereinafter referred to simply as block copolymers), ethylene-vinyl acetate copolymers, ethylene-$\alpha$-olefin copolymers, polyester resins, and the like. Of these, the block copolymers are being used in increasing quantities because they have a relatively well balanced combination of tackiness and creep resistance.

As such block copolymers, various ones have been commercialized, including styrene-isoprene block copolymers, styrene-butadiene block copolymers, and hydrogenated styrenebutadiene block copolymers.

As the tackifier, natural resins such as rosins and terpene resins and petroleum resins such as aliphatic or aromatic resins and these aliphatic and aromatic hybrids are frequently used. As the softener, liquid resins are generally incorporated, such as process oils obtained from mineral oils, plasticizers, polybutene, and liquid rubbers.

The pressure-sensitive adhesive having such a composition is required to have an adequate viscosity in order that even when being pressed lightly, e.g., pressed by a finger, it can come into sufficient contact with the adherend surface to have a sufficiently large contact area in terms of microscopic contact area. Furthermore, the pressure-sensitive adhesive should also have elasticity so as to withstand external forces including peeling and shearing forces.

From the standpoint of smoothly conducting coating operations in the production of a pressure-sensitive adhesive product by the hot melt technique, there is an adequate viscosity range for the hot melt pressure-sensitive adhesive. In general, hot melt pressure-sensitive adhesives are required to have lower melt viscosities than solvent-based and other pressure-sensitive adhesives.

Although process oils are used to lower melt viscosity and this results in an improvement in tack, incorporation of process oils produces adverse effects, e.g., a decrease in holding power. Accordingly, there is no process oil which, when incorporated in a hot melt pressure-sensitive adhesive, enables the adhesive to have a well balanced combination of tack, adhesion strength, and holding power which are called three tackiness properties.

The conventional hot melt pressure-sensitive adhesives are also insufficient not only in adhesion to nonpolar polyolefin adherends especially at low temperatures, such performance being recently desired increasing in the industrial fields, but also in holding power.

SUMMARY OF THE INVENTION

The present inventors have conducted intensive studies in order to overcome the conventional problems described above. As a result, with respect to the conventionally frequently investigated relationship between the tackiness properties of hot melt pressure-sensitive adhesives and the chemical structures of softeners, it has been found that with the use of a hydrogenated liquid petroleum resin having a specific chemical structure, the viscosity of a hot melt pressure-sensitive adhesive is lowered without impairing its holding power and a greatly improved balance among tackiness properties can be attained. The present invention has been completed based on this finding.

Accordingly, an object of the present invention is to provide a liquid petroleum resin which is light colored or colorless and is odorless and which, when incorporated as a softener in a hot melt pressure-sensitive adhesive, enables the adhesive to show excellent performances with respect to the three tackiness properties.

Another object of the present invention is to provide a pressure-sensitive adhesive composition containing the liquid petroleum resin as a softener and showing excellent performances. In the adhesive composition, the softener functions to lower the glass transition temperature of the pressure-sensitive adhesive and enhance the flowability of the adhesive and, hence, to improve both workability and tackiness.

Other objects and effects of the present invention will be apparent from the following description.

In one aspect of the present invention, a novel hydrogenated liquid petroleum resin having a specific chemical structure is provided by hydrogenating an aromatic liquid petroleum resin having a structure in which aromatic rings are linked by the medium of a methylene group.

This hydrogenated liquid petroleum resin has a low viscosity and a light or no color, and hot melt pressuresensitive adhesives employing the petroleum resin as a softener show excellent tackiness properties even when applied to polyolefins.

DETAILED DESCRIPTION OF THE INVENTION

The hydrogenated liquid petroleum resin according to the present invention is explained below in regard to its application to hot melt pressure-sensitive adhesives.

A block copolymer for use in hot melt pressure-sensitive adhesives has a structure comprising a hard segment consisting of a polymer of a vinyl-containing aromatic hydrocarbon and a soft segment consisting of a polymer of a conjugated diene. At room temperature, the block copolymer shows rubbery elasticity due to the hard segments which apparently function as crosslinked sites, so that creep resistance is imparted to hot melt pressure-sensitive adhesives based on the block copolymer. At elevated temperatures, the block copolymer is plasticized due to the hard segments to thereby impart moderate flowability to hot melt pressure-sensitive adhesives.

A softener serves to modify the tackiness properties and melt properties of such a block copolymer, in different manners depending on whether it is compatible with the hard segments or soft segments of the block copolymer.

For example, in general, a softener compatible with soft segments is incorporated in order to improve tackiness, while a softener compatible with hard segments is incorporated in order to lower melt viscosity.

Actually, however, there is no softener which is compatible with only either of hard segments and soft segments. It is, therefore, thought that a well balanced combination of tackiness properties is attained by a subtle combination of properties of the block copolymer to be used, i.e., the proportion of the vinyl-containing aromatic hydrocarbon to the conjugated diene and the polymerization degree of each segment, with softener properties.

It is a matter of course that the tackiness properties of a pressure-sensitive adhesive are greatly influenced by the kind of the tackifier incorporated.

The hydrogenated liquid petroleum resin having a novel chemical structure, to be used in the hot melt pressure-sensitive adhesive composition of the present invention, is not particularly limited in production method therefor, as long as it is obtained by hydrogenating an oligomer having a structure in which aromatic rings are linked by the medium of a methylene group. However, one preferred example of the hydrogenated liquid petroleum resin is produced as follows.

An aromatic raw material is used for producing the oligomer to be hydrogenated. This aromatic raw material is not particularly limited as long as it is a benzene derivative formed by substituting benzene with 1 to 4 substituents with a relatively small carbon number, such as methyl or ethyl group, a derivative of any of various condensed polycyclic aromatic compounds, a mixture of two or more of such benzene derivatives and polycyclic aromatic compounds, or a fraction containing one or more of these. Examples of the benzene derivative include toluene, xylene, ethylbenzene, methylethylbenzene, trimethylbenzene, durene, and isodurene. Examples of the condensed polycyclic aromatic compounds include indane, naphthalene, and anthracene.

Use of a raw oil containing, besides any of the above-enumerated reactive aromatic compounds, an aromatic compound having a substituent with a relatively large carbon number, such as propyl or butyl group, or a nonaromatic compound such as a paraffin or naphthene does not cause any particular problem, since these compounds have low or no reactivity with formaldehyde and, hence, function only as a solvent.

It is, however, necessary that the content of the reactive aromatic compound(s) in the raw oil be taken in account when determining the molar ratio of the raw oil to formaldehyde as described later.

Practically preferred examples of the raw oil generally include toluene, mixed xylene fractions obtained from reforming or cracking systems, and $C_9$ or $C_{10}$ aromatic fraction obtained from bottom residues resulting from xylene production, isomerization, etc.

Formaldehyde is used as the other raw material for producing the oligomer to be hydrogenated. The formaldehyde may be fed in any form; in other words, any kind of formaldehyde source may be used as long as it yields monomeric formaldehyde in the reaction system. For example, commercially available formalin of various concentrations and polymerization products of formaldehyde, such as trioxane and paraformaldehyde, may be used as they are. Of these, use of paraformaldehyde is most preferred because it does not lower the concentration of a catalyst (formalin reduces the concentration since it is an aqueous solution) and because it is inexpensive and easily available.

It is also possible that gaseous formaldehyde separately generated by any method be introduced into the reaction system after being dissolved in the raw oil, a catalyst (if it is liquid), a solvent, etc.

An acid catalyst is used for the reaction of the raw oil with formaldehyde. This catalyst is not particularly limited as long as it is an acid. Examples of the acid catalyst include sulfuric acid, phosphoric acid, pyrophosphoric acid, perchloric acid, aluminum chloride, and boron trifluoride. Of these, sulfuric acid is advantageously used because it is inexpensive and can be reused easily.

Use of a solvent is not particularly needed for the reaction of the raw oil with formaldehyde because the excess raw oil functions as a solvent. If necessary, however, a solvent (e.g., an isoparaffin) which does not take part in the reaction may be added in an adequate amount.

In order to obtain an aromatic liquid petroleum resin from which the hydrogenated liquid petroleum resin of the present invention is to be produced, the molar ratio of formaldehyde to the reactive aromatic compound(s) should be 1 or less, preferably 0.8 or less.

There is a general tendency that as the molar proportion of formaldehyde is lowered, the yield of a petroleum resin produced is lowered but the selectivity for a liquid fraction is improved, although this depends on the kind of the aromatic compound(s) used as the raw material.

The amount of the catalyst to be used in the reaction of the raw oil with formaldehyde cannot be fixed unconditionally because it is closely related to reaction conditions. In general, however, the catalyst is used in an amount of from 5 to 50% by weight, preferably from 15 to 35% by weight, based on the amount of the reactive aromatic compound(s) in the raw oil.

The reaction temperature for the reaction of the raw oil with formaldehyde cannot be fixed unconditionally because it depends on the kinds and amounts of the raw oil and catalyst and other considerations. Generally, however, a temperature between 60° and 180° C., preferably between 80° and 120° C., may be used.

The reaction time for the reaction of the raw oil with formaldehyde cannot be fixed unconditionally because it depends on the kinds and amounts of the raw oil and catalyst. Generally, however, the reaction may be conducted for from 0.5 to 10 hours, preferably from 2 to 5 hours.

The reaction mixture resulting from the reaction of the raw oil with formaldehyde is first treated to remove the catalyst, wash the mixture (for removing acid substances present in a slight amount ), and remove unreacted oil components, solvent (if used), and more volatile components formed by the reaction, thereby to obtain a crude reaction product.

The crude reaction product is then distilled to obtain an aromatic liquid petroleum resin . Conditions for this distillation cannot be fixed unconditionally, because the conditions depend on the kind of the raw oil and desired properties of the aromatic liquid petroleum resin to be obtained. Usually, however, distillation is conducted at a reduced pressure of 5 mmHg or less, preferably 2 mmHg or less, and a fraction having a boiling range of from 300° to 470° C., preferably from 360° to 420° C., in terms of boiling point under ordinary pressure is obtained as the desired aromatic liquid petroleum resin.

The thus-obtained aromatic liquid petroleum resin consists mainly of an oligomer having a structure in which one or more aromatic rings and a methylene group are bonded alternately and the molecule is terminated by an aromatic ring or methyl group.

This aromatic liquid petroleum resin is then hydrogenated to obtain a hydrogenated liquid petroleum resin according to the present invention.

Methods for the hydrogenation are not particularly limited as long as from 20 to 100%, preferably from 50 to 100%, of all the aromatic rings contained in the aromatic liquid petroleum resin are hydrogenated. A conventionally known technique may be used for the hydrogenation.

If the degree of the hydrogenation of aromatic rings is 20% or less, a sufficient improvement in balance among tackiness properties cannot be attained. The 20-100% hydrogenation for aromatic rings herein means that the degree of hydrogenation as measured with an ultraviolet spectrometer is from 20 to 100%, as described later.

The hydrogenation reaction may be conducted either continuously or batch-wise. For example, a conventionally known method such as a batch-wise suspended-bed method employing a powdery catalyst, a flow-type suspended bubble tower method, or the like may be used.

The catalyst for use in the hydrogenation also is not particularly limited. Examples thereof include Group VI and Group VIII metals of the periodic table, e.g., nickel, palladium, platinum, cobalt, ruthenium, and rhodium, and oxides or sulfides thereof, and other compounds of these metals. Further, catalysts comprising such Group VI and Group VIII metals supported on carries such as kieselguhr, alumina, carbon, silica, and the like are also usable.

The catalyst is used in an amount of generally from 0.1 to 50% by weight, preferably from 0.5 to 10% by weight, based on the amount of the resin to be hydrogenated.

Conditions for the hydrogenation reaction cannot be fixed unconditionally because the conditions depend on the catalyst being used, properties required of the product to be produced, and other considerations. However, the hydrogenation reaction may be conducted at a temperature of generally from 50° to 300° C., preferably from 150° to 250° C., and a hydrogen pressure of generally from 5 to 300 $kg/cm^2$, preferably from 30 to 250 $kg/cm^2$. Although the hydrogenation can be performed without a solvent, it is possible to use an unreactive solvent such as cyclohexane, n-hexane, or an isoparaffin.

The thus-yielded hydrogenated liquid petroleum resin has a chemical structure in which part or all of the aromatic rings linked with one another by a methylene group have been hydrogenated.

In the case where the hydrogenated liquid petroleum resin according to the present invention is used to prepare a hot melt pressure-sensitive adhesive, an elastomer of any kind may be employed as the base polymer as long as the elastomer is compatible with the resin of the present invention. However, preferred examples of the elastomer include various kinds of block copolymers such as styreneisoprene block copolymers, styrene-butadiene block copolymers, and hydrogenated styrene-butadiene block copolymers.

With a mixture of such an elastomer and a tackifier, the hydrogenated liquid petroleum resin of the present invention may be blended in a proportion which is determined according to the intended use of the pressure-sensitive adhesive to be produced. Other softener(s), such as dioctyl phthalate, dibutyl phthalate, process oil, and polybutene, may be added in such an amount as not to result in a decrease in adhesive performance.

The tackifier resin is selected, according to the intended application of the adhesive, from rosins and derivatives thereof, terpene resins, aliphatic resins, alicyclic resins, aromatic resins, copolymer resins, and the like.

In general, the proper ranges of the proportions of the elastomer, tackifier resin, and softener are such that the amounts of the tackifier resin and the softener are from 10 to 200 parts by weight and from 5 to 50 parts by weight, respectively, per 100 parts by weight of the elastomer.

If required and necessary, a filler such as calcium carbonate, zinc white, titanium oxide, or silica, an antiaging agent or stabilizer of the amine, ketone-amine, or phenolic type or other type, and other additives may be added in any proportions.

For blending the above-described ingredients, any mixing method may be employed without particular limitation. For example, a commonly employed apparatus such as a melting tank, kneader, mixing rolls, extruder, internal mixer, or the like can be used.

The present invention will be explained below in more detail with reference the following examples, but the invention is not construed as being limited thereto.

In the following Examples and Comparative Examples, the color of each of the hydrogenated liquid petroleum resins, aromatic liquid petroleum resin, and process oils produced or used therein was determined by measuring its Saybolt color in accordance with JIS K-2580, while the density and kinematic viscosity thereof were measured in accordance with JIS K-2249 and JIS K-2283, respectively.

Further, the degree of hydrogenation was calculated from absorbance values measured at 265 nm with an ultraviolet spectrometer, using the following equation:

Degree of hydrogenation (%) = $100 \times (A-B)/A$ where A is the absorbance of the raw aromatic liquid petroleum resin and B is the absorbance of the hydrogenated liquid petroleum resin.

For the purpose of evaluating each of the hydrogenated liquid petroleum resins produced in the Examples, a hot melt pressure-sensitive adhesive was prepared using each resin by the following method and evaluated for melt viscosity and adhesion performance.

To 100 parts by weight of a styrene-isoprene block copolymer (SIS; Cariflex TR1107, tradename, manufactured by Shell Chemical Co.) were added 100 parts by weight of a tackifier ($C_5$ petroleum resin; Escorez 1304, tradename, manufactured by Exxon Chemical Co.) and, as a softener, 40 parts by weight of a hydrogenated liquid petroleum resin according to the present invention or a comparative softener. This mixture was melted by heating and the melt was coated on a 50-μm polyester film at a thickness of 40 μm, thereby to produce a pressure-sensitive adhesive tape.

The pressure-sensitive adhesive tape thus obtained was tested for the three tackiness properties, i.e., tack, adhesion strength, and holding power. The test methods used are as follows.

(1) Ball Tack

Tack was measured by the J. Dow type rolling ball tack method under conditions of an approach distance of 10 cm, slope angle of 30 degrees, and temperature of 23° C. The tack value is shown in terms of the diameter ($\times 1/32$ inch) of the largest ball which stopped on the tape.

(2) Adhesion Strength (180° Peel Strength)

A pressure-sensitive adhesive tape sample having a width of 25 mm was applied to each of a stainless-steel and polyethylene adhered plates. The tape was then peeled from the adhered in the 180° direction at a rate of 300 mm/min, and the load needed for the peeling was measured.

(3) Holding Power

A pressure-sensitive adhesive tape sample was applied to each of a stainless-steel and polyethylene adhered plates in such a manner that the tape covered an area of 25 mm x 25 mm on the adhered surface. A 1-kg weight was then hung from the tape sample. This tape with the weight was preheated at 40° C. for 10 minutes and then heated further at a rate of 2° C./5min, and the temperature at which the tape fell from the adhered was measured.

COMPARATIVE EXAMPLE 1

(Production of Aromatic Liquid Petroleum Resin)

Into a four-necked flask equipped with a stirrer and reflux condenser were introduced 240 g of a $C_9$ aromatic fraction having a boiling range of from 150° to 180° C. and obtained from a bottom residue resulting from xylene production by reforming, and 20 g of commercially available 92% paraformaldehyde for industrial use. While the contents were kept being stirred gently, 75 g of commercially available 75% dilute sulfuric acid was added thereto dropwise. The composition of the bottom residue used above as a raw material is shown in Table 1.

After completion of the addition of sulfuric acid, the temperature of the reaction mixture was raised to 100 to 110° C. and reaction was conducted at that temperature for 3 hours with vigorous stirring.

After the reaction, the resulting mixture was cooled to room temperature, transferred to a separatory funnel, and then allowed to stand therein, upon which a sulfuric acid layer separated as the lower layer. The sulfuric acid layer was removed and the remaining oily layer was washed repeatedly with water several times until the washings came to have a pH of 7.

The oily layer thus obtained was transferred to a distilling flask. Vacuum distillation was conducted first at 10 mmHg to remove unreacted oil components and then at a higher vacuum of 1 mmHg. Thus, 92 g of a fraction having a boiling range of from 360° to 420° C. in terms of boiling point under ordinary pressure was obtained as an aromatic liquid petroleum resin. Properties of this resin are shown in Table 2, while results of the evaluation of a hot melt pressuresensitive adhesive containing the resin as a softener are shown in Table 3.

EXAMPLE 1

Production of Hydrogenated Liquid Petroleum Resin

In an autoclave was placed 100 g of the aromatic liquid petroleum resin produced in Comparative Example 1. At a hydrogen pressure of 100 kg/cm$^2$G, hydrogenation of the resin was conducted at a temperature of 250° C. for 2 hours in the presence of 2 g of a nickel-/kieselguhr catalyst (N 113, tradename, manufactured by Nikki Chemical Co., Ltd., Japan).

After completion of the reaction and cooling, the gas within the autoclave was removed and the catalyst was filtered out, thereby obtaining 95 g of a hydrogenated liquid petroleum resin having a hydrogenation degree of 96.3%. Properties of the thus-obtained hydrogenated liquid petroleum resin are shown in Table 2, while results of the evaluation of a hot melt pressure-sensitive adhesive containing the hydrogenated resin as a softener are shown in Table 3.

EXAMPLE 2

The same procedures as in Example 1 were conducted except that among the hydrogenation conditions, the catalyst amount was changed to 0.5 g and the hydrogen pressure was changed to 70 kg/cm$^2$G. Thus, 95 g of a hydrogenated liquid petroleum resin having a hydrogenation degree of 88.7% was obtained.

Properties of the thus-obtained hydrogenated liquid petroleum resin are shown in Table 2, while results of the evaluation of a hot melt pressure-sensitive adhesive containing the hydrogenated resin as a softener are shown in Table 3.

EXAMPLE 3

The same procedures as in Example 1 were conducted except that among the hydrogenation conditions, the catalyst amount was changed to 0.2 g and the temperature was changed to 200° C. Thus, 92 g of a hydrogenated liquid petroleum resin having a hydrogenation degree of 60.5% was obtained.

Properties of the thus-obtained hydrogenated liquid petroleum resin are shown in Table 2, while results of the evaluation of a hot melt pressure-sensitive adhesive containing the hydrogenated resin as a softener are shown in Table 3.

COMPARATIVE EXAMPLE 2

Naphthenic process oil Shellflex 371N (tradename, manufactured by Shell Chemical Co.) was evaluated as a comparative softener. Properties of this oil are shown in Table 2, while results of the evaluation of a hot melt pressure-sensitive adhesive containing the process oil as a softener are shown in Table 3.

COMPARATIVE EXAMPLE 3

Paraffinic process oil, Mitsubishi 10 Light Process Oil (tradename, manufactured by Mitsubishi Oil Co., Ltd., Japan) was evaluated as a comparative softener. Properties of this oil are shown in Table 2, while results of the evaluation of a hot melt pressure-sensitive adhesive containing the process oil as a softener are shown in Table 3.

TABLE 1

| Components | wt % |
| --- | --- |
| More volatile components | 0.9 |
| Isopropylbenzene | 0.7 |
| n-Propylbenzene | 5.7 |
| 1-Methyl-3-ethylbenzene | 20.6 |
| 1-Methyl-4-ethylbenzene | 9.8 |
| 1-Methyl-2-ethylbenzene | 6.2 |
| 1,3,5-Trimethylbenzene | 11.4 |
| 1,2,4-Trimethylbenzene | 31.3 |
| 1,2,3-Trimethylbenzene | 5.3 |
| Indane | 1.7 |
| Others | 6.4 |

TABLE 2

|  | Example 1 | Example 2 | Example 3 | Comparative Example 1 | Comparative Example 2 | Comparative Example 3 |
| --- | --- | --- | --- | --- | --- | --- |
| Saybolt color | +30≦ | +30≦ | +30≦ | +16 | +4 | +6 |
| Density, 15° C. g/cm$^3$ | 0.8848 | 0.9014 | 0.9302 | 0.9755 | 0.8979 | 0.8651 |
| Kinematic viscosity, 40° C. mm$^2$/s | 16.74 | 26.02 | 27.35 | 31.92 | 81.66 | 26.50 |

TABLE 3

|  | Example 1 | Example 2 | Example 3 | Comparative Example 1 | Comparative Example 2 | Comparative Example 3 |
| --- | --- | --- | --- | --- | --- | --- |
| Melt viscosity, @ 170° C. (Pa · s) | 22.7 | 25.8 | 25.7 | 25.8 | 30.8 | 27.5 |
| Tack (ball No.) | 14 | 15 | 15 | 16 | 15 | 14 |
| Adhesion strength (180° Peel strength, Kgf/25 mm) | | | | | | |
| stainless steel | | | | | | |
| 0° C. | 2.70 | 2.73 | 2.65 | 2.72 | 2.50 | 2.00 |
| 20° C. | 1.40 | 1.45 | 1.37 | 1.44 | 1.27 | 0.96 |
| 40° C. | 0.76 | 0.78 | 0.78 | 0.94 | 0.62 | 0.41 |
| polyethylene | | | | | | |
| 0° C. | 1.60 | 1.80 | 1.77 | 1.80 | 1.20 | 1.10 |
| 20° C. | 0.69 | 0.64 | 0.65 | 0.68 | 0.62 | 0.40 |
| Holding power, °C. | | | | | | |
| stainless steel | 87.5 | 84.5 | 75.0 | 62.5 | 83.0 | 82.5 |
| polyethylene | 78.5 | 77.0 | 68.0 | 56.0 | 65.0 | 55.0 |

As apparent from Table 2, the hydrogenated liquid petroleum resins obtained in the Examples according to the present invention had low viscosities and were light colored or colorless and were almost odorless.

Further, as apparent from Table 3, the hot melt pressure-sensitive adhesives containing the hydrogenated liquid petroleum resins of the present invention as a softener not only showed excellent coating properties due to their low melt viscosities but also had a well balanced combination of the three tackiness properties of tack, adhesion strength, and holding power. Furthermore, the hot melt pressure-sensitive adhesives showed excellent tackiness properties even when applied to nonpolar adherents such as polyethylene.

Therefore, the hydrogenated liquid petroleum resin of the present invention is expected to be used for a wide range of applications in various industrial fields as a softener having excellent performances which have not been possessed by conventional mineral oils or synthetic oils.

While the invention has been described in detail and with reference to specific embodiments thereof, it will be apparent to one skilled in the art that various changes and modifications can be made therein without departing from the spirit and scope thereof.

What is claimed is:

1. A hydrogenated liquid petroleum resin obtained by hydrogenating an aromatic liquid petroleum resin having a structure in which aromatic rings are linked by the medium of a methylene group.

2. A hot melt pressure-sensitive adhesive composition containing a hydrogenated liquid petroleum resin obtained by hydrogenating an aromatic liquid petroleum resin having a structure in which aromatic rings are linked by the medium of a methylene group.

3. A hydrogenated liquid petroleum resin as claimed in claim 1, wherein said aromatic liquid petroleum resin is a polymerization product obtained by reacting either an aromatic compound or a fraction containing an aromatic compound as a major component with formaldehyde in the presence of an acid catalyst.

4. A hot melt pressure-sensitive adhesive composition as claimed in claim 2, wherein said aromatic liquid petroleum resin is a polymerization product obtained by reacting either an aromatic compound or a fraction containing an aromatic compound as a major component with formaldehyde in the presence of an acid catalyst.

5. A hydrogenated liquid petroleum resin as claimed in claim 3, wherein said aromatic compound or said fraction containing an aromatic compound as a major component is one member selected from the group consisting of toluene, a mixed xylene fraction obtained from a reforming or cracking system, and a $C_9$ or $C_{10}$ aromatic fraction obtained from a bottom residue resulting from xylene production or isomerization.

6. A hot melt pressure-sensitive adhesive composition as claimed in claim 4, wherein said aromatic compound or said fraction containing an aromatic compound as a major component is one member selected from the group consisting of toluene, a mixed xylene fraction obtained from a reforming or cracking system, and a $C_9$ or $C_{10}$ aromatic fraction obtained from a bottom residue resulting from xylene production or isomerization.

7. A hydrogenated liquid petroleum resin as claimed in claim 3, wherein said aromatic compound or said fraction containing an aromatic compound as a major component is a $C_9$ or $C_{10}$ aromatic fraction obtained from a bottom residue resulting from xylene production or isomerization, said formaldehyde is one derived from paraformaldehyde, and said acid catalyst is sulfuric acid.

8. A hot melt pressure-sensitive adhesive composition as claimed in claim 4, wherein said aromatic compound or said fraction containing an aromatic compound as a major component is a $C_9$ or $C_{10}$ aromatic fraction obtained from a bottom residue resulting from xylene production or isomerization, said formaldehyde is one derived from paraformaldehyde, and said acid catalyst is sulfuric acid.

* * * * *